Jan. 16, 1923. 1,442,377.
J. W. WIUFF.
AUTOMOBILE BRAKE EQUALIZER.
FILED SEPT. 26, 1921.
2 SHEETS—SHEET 1.
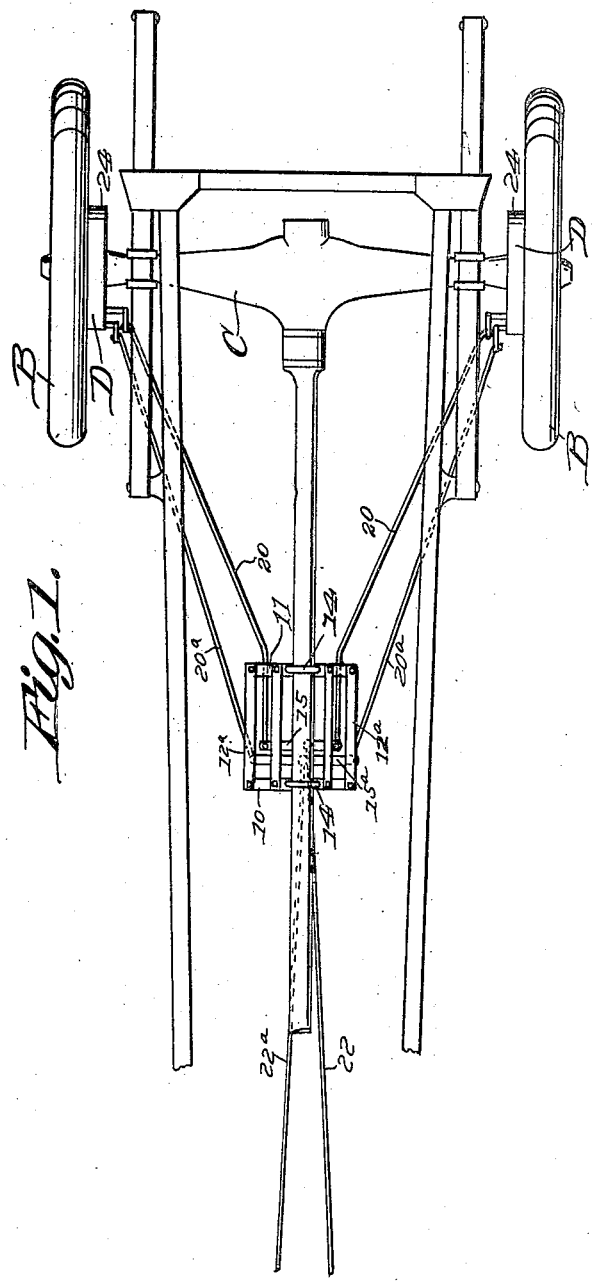
Inventor
Jesse W. Wiuff,
By Watson E. Coleman
Attorney

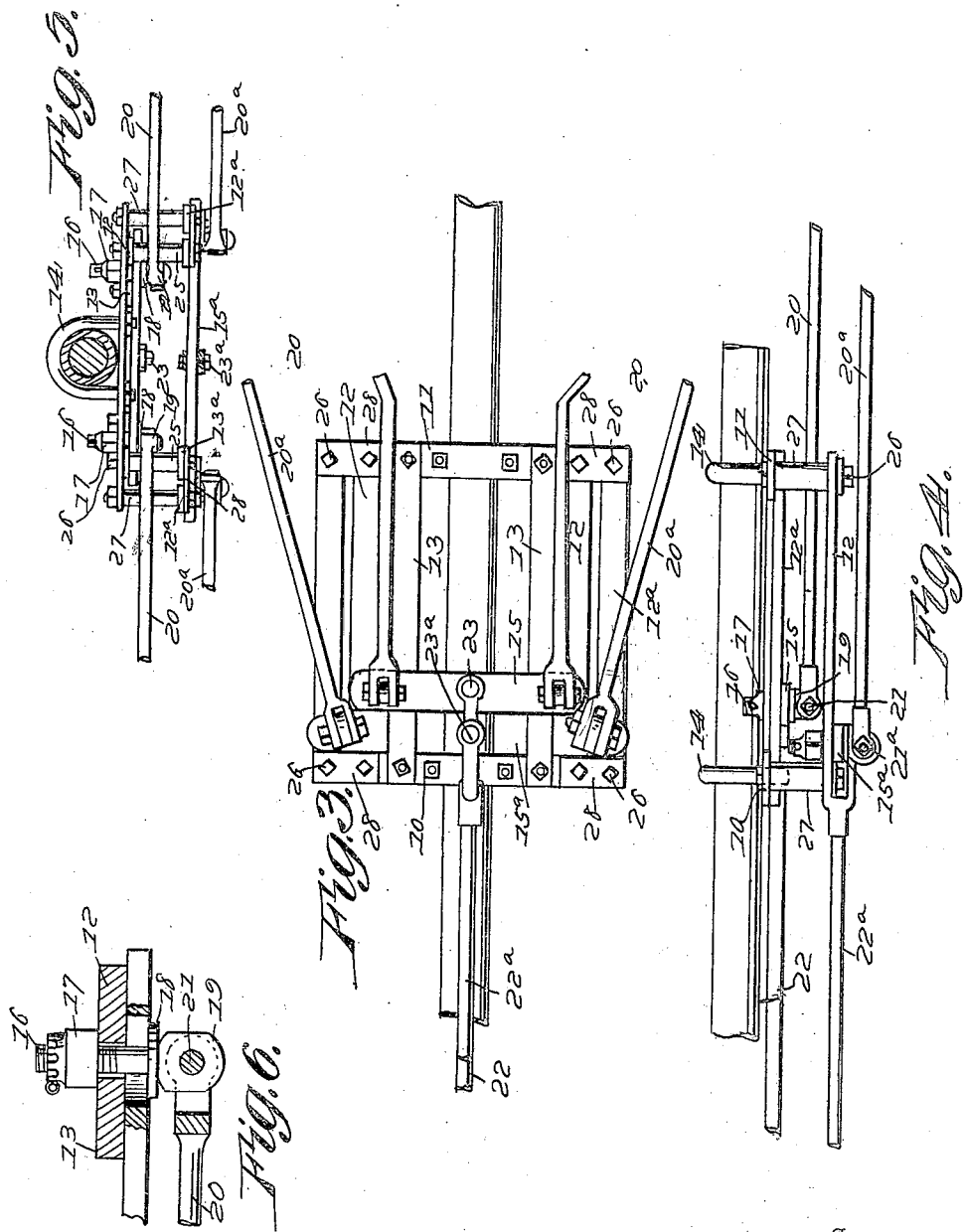

Patented Jan. 16, 1923.

1,442,377

UNITED STATES PATENT OFFICE.

JESSE W. WIUFF, OF MILROY, MINNESOTA.

AUTOMOBILE BRAKE EQUALIZER.

Application filed September 26, 1921. Serial No. 503,423.

*To all whom it may concern:*

Be it known that I, JESSE W. WIUFF, a citizen of the United States, residing at Milroy, in the county of Redwood and State of Minnesota, have invented certain new and useful Improvements in Automobile Brake Equalizers, of which the following is a specification, reference being had to the accompanying drawings.

This invention relates to brakes, and particularly to means for equalizing the pressure on the brake bands of automobiles when the brake is applied so that in case one brake band is worn more than the other brake band, yet an equal pressure will be exerted on both brake bands when the brake is applied.

A further object is to provide a construction of this character which is adapted to be arranged so that it may be used either with a single brake as well as with a double brake.

A still further object is to provide a construction of this character which is adaptable to all forms of automobile or vehicle brakes and which has few parts, which is very simple in construction and which may be readily assembled and applied.

Other objects will appear in the course of the following description.

My invention is illustrated in the accompanying drawings, wherein:—

Figure 1 is a top plan view of my brake equalizer applied to an automobile having brake bands;

Figure 2 is a side elevation of the construction shown in Figure 1;

Figure 3 is an enlarged bottom plan view of the equalizer.

Figure 4 is a side elevation of the equalizer and part of the casing which contains the shaft which connects the differential and transmission mechanisms;

Figure 5 is an end elevation of the equalizer;

Figure 6 is a vertical sectional view on an enlarged scale through the guides 12 and 13 and the equalizer bar 15.

Referring to these drawings, it will be seen that my equalizer comprises the transverse bars 10 and 11 disposed in spaced parallel relation to each other, these bars being connected by the two pairs of longitudinal bars 12 and 13. The bars 12 and 13 of a pair are spaced from each other so as to form a guideway extending longitudinally of the device. The bars 10 and 11 are provided with U-bolts 14 whereby the equalizer may be attached to the housing surrounding the shaft which connects to the transmission shaft.

The equalizer is to be used on an automobile having brake bands, for instance, as shown, there is provided a transverse equalizer bar 15 which shifts and oscillates under and in engagement with the bars 12 and 13. Bolts 16 pass down through the ends of the bar 15 and through the space between the bars 12 and 13, the upper ends of these bolts carrying nuts 17 of a diameter larger than the space between the guide bars 12 and 13. The nuts may be held in place by cotter pins, lock nuts, or any other suitable means. A washer 18 is disposed between the head 19 of the bolt and the equalizer bar 15 and the lower end or head of the bolt 16 is formed as a centrally disposed lug 19. To these lugs 19 are connected the rearwardly projecting rods 20, these rods being forked at their extremities to embrace the lug 19 and being held in pivotal engagement with the lugs by means of transverse bolts 21 carrying nuts thereon. Thus it will be seen that the rods 20 are adapted to swing in a horizontal plane upon the axes of the bolts 19 and that they are also adapted to swing in a vertical plane upon the axes of the bolts 21. It will likewise be seen that the equalizer bar 15 may be shifted backward and forward under the guide bars 12 and 13.

The brake rod 22 which is connected to the brake applying means, such as a pedal or hand operated lever, is forked at its rear end to embrace the equalizer bar 15 and is pivoted to the middle of this bar by means of a vertical bolt 23. It will be seen now that if the brake bands 24 are evenly worn that they will both be applied with the same force, but that if one band, for instance the right hand brake band, is worn to a greater extent than the left hand brake band, then when the brake rod 22 is shifted forward the equalizer 15 will turn upon its pivot 23 to an amount equal to the difference in wear between the two bands and both bands will be applied with equal force.

Some motor driven vehicles such as trucks have forward and rear drive wheels, hence there will be forward and rear brake bands, in which case the equalizing mechanism for equalizing the pressure on the brake bands may be duplicated for the forward brake bands. Mounted upon the extremities of the cross bars 10 and 11 are the depending sleeves 25, through which bolts 26 pass, and disposed at the extremities of the bars 12 are depending sleeves 27, through which bolts pass. These bolts are connected by cross pieces 28 and supported upon these bolts and in engagement with the lower ends of the sleeves are the two pairs of longitudinally extending guide bars $12^a$ and $13^a$ (with which the cross pieces 28 engage) spaced apart as described. Engaging with the under faces of these guide bars is the equalizer bar $15^a$ carrying at its ends the bolts $16^a$ which pass through slots in the equalizer bar $15^a$ just as the bolts 16 pass upward through slots in the equalizer 15. The center of this equalizing bar $15^a$ is connected by a bolt $23^a$ to the brake operating rod $22^a$. This equalizing device acts in exactly the same manner as the first named equalizing device but the combined device provides means whereby both sets of brake bands may be readily operated and in such wise, as to compensate for wear.

It is the aim not to limit the construction and arrangement of the beams, or the manner in which the beams are operated by the rods 20 and $20^a$, as it is obvious that the equalizer may be applied to various sizes of brake structures with but slight change, and without departing from the spirit of the invention, as embodied in the appended claims. Furthermore, the details of construction or the exact arrangement of the parts are not to be limited, as these may be varied in many ways.

The application of the present equalizer mechanism to the brake system of an automobile has been illustrated in Figures 1 and 2. In these figures, A designates the casing, which connects the transmission and differential casings of an automobile, B the rear wheels, C the rear axle casing, and D the brake bands. The brake bands are of the same construction, and their levers E are operatively connected to the rods 20 and $20^a$, which are in turn connected to the equalizer, whereas the operating rods 22 and $22^a$ are extended forwardly as shown, and are connected to the pedal and lever F and F', whereby the brake bands may be applied. Figures 1 and 2 simply illustrate the application of an equalizing device, therefore it is to be understood that the same is not to be limited to this construction and arrangement.

The invention having been set forth, what is claimed as being useful is:

1. The combination with a pair of brake bands, of means for operating the brake bands and equalizing pressure thereon including a frame supporting longitudinal guides, an equalizer bar slidingly supported at its ends upon said guides, brake operating rods pivotally connected to the bar and operatively connected to said bands, and a brake rod operatively connected to the middle of the equalizer bar.

2. The combination with a pair of brake bands, of means for operating the brake bands and equalizing pressure thereon including a frame supporting longitudinal guides, an equalizer bar slidingly supported at its ends upon said guides, brake operating rods pivotally connected to the ends of the equalizer bar for swinging movement in a horizontal and in a vertical plane, and a brake rod pivoted to the middle of the equalizer bar.

3. The combination with a pair of brake bands, of means for operating them and equalizing the pressure thereon comprising a supporting frame, two pairs of longitudinally extending spaced guide bars mounted upon the frame and in parallel relation to each other, a transversely extending equalizer bar extending at its ends over said guide bars and resting thereon, bolts passing upward through the spaces between said guide bars and having sliding engagement therewith, brake rods pivotally connected to said bolts and operatively connected to the brake bands, a brake operating rod pivotally connected to the middle of the equalizing bar, and clamping members mounted upon the first named transverse bars and adapted to engage the casing of an automobile center drive shaft to support the equalizer thereon.

4. In a pressure equalizer for brakes, the combination with brake bands, of an equalizer bar, rods extending over the ends of the equalizer bar and pivoted thereto and operatively connected to the brake bands, and a brake rod pivotally connected to the middle of the equalizer bar.

5. In a pressure equalizer for brakes, the combination with brake bands, of an equalizer bar, rods extending over the ends of the equalizer bar and pivoted thereto and operatively connected to the brake bands, a brake rod pivotally connected to the middle of the equalizer bar, and means for supporting the ends of the equalizer bar and permitting longitudinal movement thereof.

6. In a pressure equalizer for brakes, the combination with two pairs of brake bands, of means for equalizing the pressure on said brake bands when the brakes are applied comprising two equalizing bars, operating rods pivotally connected to the middle of each equalizing bar, and brake rods pivotally and swingingly engaged with the extremities of each equalizing bar and extending to one pair of the brakes.

7. In a pressure equalizer for brakes, the combination with two sets of brakes therefor, of means for operating and equalizing both sets of brakes comprising a supporting frame having upper and lower sets of longitudinally extending guide bars spaced from each other to provide guides, a lower equalizing bar having its ends resting upon the lower set of guide bars, pivot bolts passing between the guide bars and the lower set and through the ends of the equalizing bar, brake rods swingingly connected to said bolts, an upper equalizing bar having its ends resting upon the upper guide bars, bolts passing through the upper extremities of the upper equalizing rod and through the guide slots, brake rods swingingly connected to the upper ends of said bolts, and brake operating rods each pivotally connected to the middle of one of the equalizing bars.

8. An equalizing device for brakes comprising a supporting frame formed to provide longitudinally extending guide slots, an equalizing bar having its ends disposed in a plane with the guide slots, bolts passing through the guide slots and the ends of the equalizing bar, brake rods connected to said bolts, and an operating rod pivotally connected to the middle of the equalizing bar.

9. An equalizing mechanism for automobile brakes comprising transverse supporting bars, longitudinally extending pairs of guide bars mounted upon the extremities of the transverse bars and spaced from each other, U-bolts passing through the transverse bars, sleeves mounted upon the ends of the transverse bars and extending therefrom, longitudinally extending guide bars bolted to the upper ends of said sleeves and spaced from each other, upper and lower equalizing bars resting upon the upper and lower pairs of guide bars, bolts passing through the spaces between the guide bars and through the ends of the equalizing bars, brake operating rods pivotally connected to the middle of each equalizing bar, and brake rods pivotally engaged with the bolts and operatively connected to the automobile brake bands.

10. In an equalizing device, a supporting frame adapted for suspension from the housing surrounding the shaft which connects to the transmission shaft, said frame comprising upper and lower pairs of guides, upper and lower equalizing bars respectively having their ends disposed in planes parallel with the guides, means shiftably carried by the ends and movable in the guides, brake bands to be actuated, members connecting said brake bands and the last named means, whereby as the equalizing bars are operated the brake bands may be operatively tensioned.

11. In an equalizing device, a supporting frame adapted for suspension from the housing surrounding the shaft which connects to the transmission shaft, said frame comprising upper and lower pairs of guides, upper and lower equalizing bars respectively having their ends disposed in planes parallel with the guides, means shiftably carried by the ends and movable in the guides, brake bands to be actuated, members connecting said brake bands and the last named means, whereby as the equalizing bars are operated the brake bands may be operatively tensioned, the lower pairs of guides arranged in planes offset below and laterally to one side of the upper guides, whereby the connections between the members and the last named means may pass as the equalizing bars shift and oscillate.

In testimony whereof I hereunto affix my signature.

JESSE W. WIUFF.